March 22, 1932.  W. P. SLEDGE ET AL  1,850,480
FEEDING DEVICE FOR CANS
Filed May 12, 1931   2 Sheets-Sheet 1

Inventors,
William P. Sledge and
John Le Frank

By Ritter, Michlin & O'Neill
Attorneys

March 22, 1932. W. P. SLEDGE ET AL 1,850,480
FEEDING DEVICE FOR CANS
Filed May 12, 1931 2 Sheets-Sheet 2

Inventors,
William P. Sledge &
John Le Frank.
By Ritter, Mechlin & O'Neill
Attorneys Patented Mar. 22, 1932

1,850,480

UNITED STATES PATENT OFFICE

WILLIAM P. SLEDGE AND JOHN LE FRANK, OF HONOLULU, TERRITORY OF HAWAII, ASSIGNORS TO HAWAIIAN PINEAPPLE COMPANY, LIMITED, OF HONOLULU, TERRITORY OF HAWAII, A CORPORATION OF HAWAII

FEEDING DEVICE FOR CANS

Application filed May 12, 1931. Serial No. 536,860.

The invention relates to apparatus for feeding cans from trays to a processing machine to which the cans are to be delivered singly and preferably in a continuous row, said apparatus including a conveyor adapted to transport open sided can carrying trays and a rotary table disposed at one side of the conveyor, said table being provided with stationary guard rails adjacent its periphery, one of which rails extends over the conveyor and the trays thereon at an angle to the line of movement of the conveyor to engage the cans carried by the trays and force said cans onto the table, one of the guard rails being associated with a guide rail to form a discharge for the cans in a single row or file from the table, said discharge either delivering the cans to a second table of the same general character or to the processing machine.

The invention is illustrated in the accompanying drawings, in which:—

Figures 1, 2:
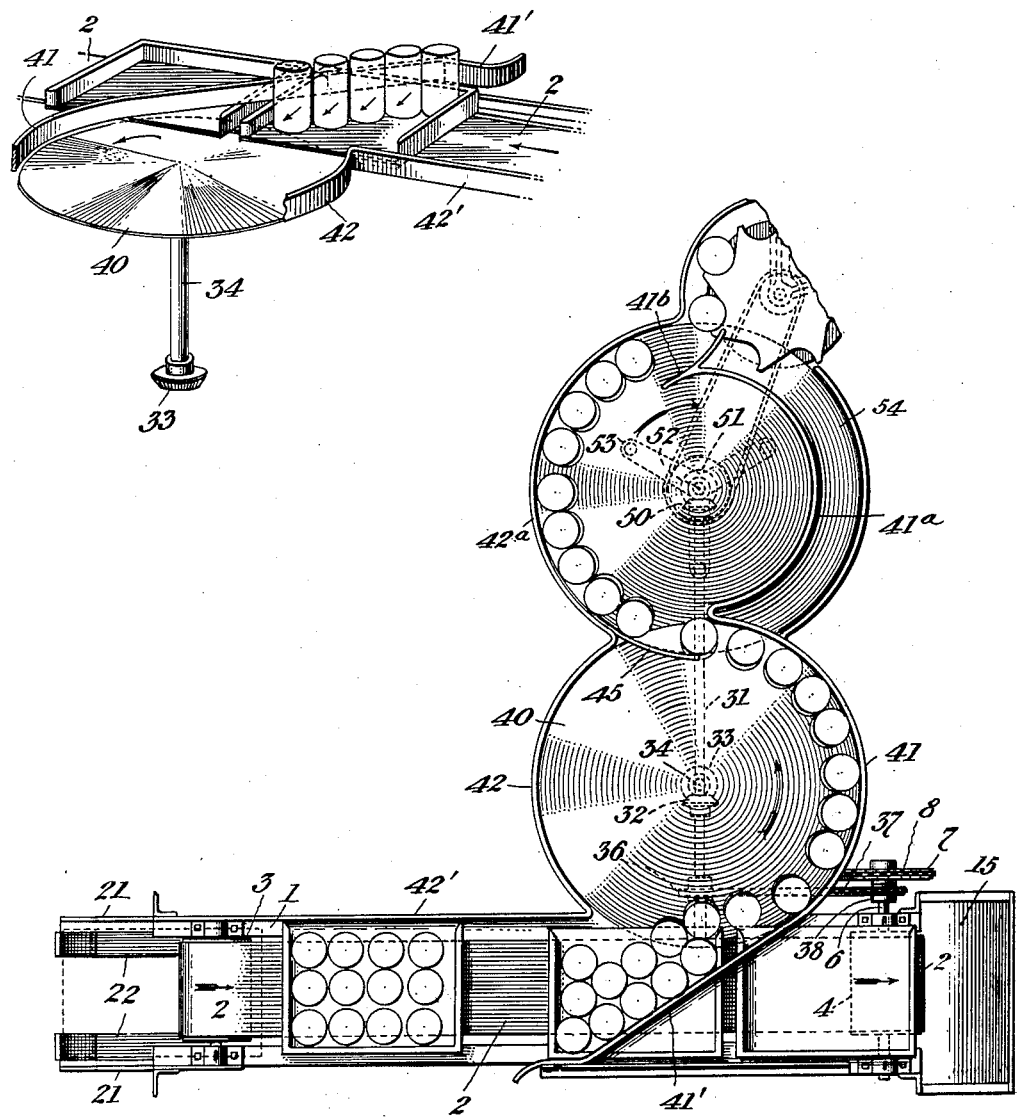
Fig. 1 is a plan view of the apparatus.
Fig. 2 is a perspective view of a section of the conveyor and the feed table.

Referring to the drawings, 1 indicates the main frame of the machine, preferably constructed of angle bars and strips, the top members of which support a belt conveyor 2 passing around a drive pulley 4 at one end of the machine and a guide pulley 3 at the opposite end, the direction of movement of the upper reach of the belt being from pulley 3 toward pulley 4. Pulley 4 is driven by a sprocket 38 and drive chain 37, which latter is actuated by a sprocket 36 on drive shaft 31.

Figure 3:
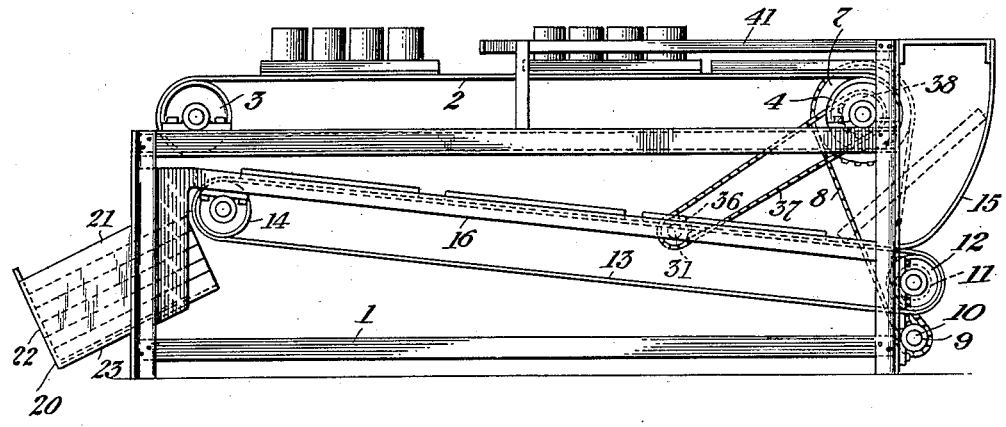
Fig. 3 is a side elevation.

Mounted on longitudinal inclined rails 16 secured to the main frame is a second continuous belt conveyor 13 passing over drive pulley 12 at the rear of the frame and a guide pulley 14 at the forward part of the frame, the shaft of which pulley is journaled in bearings mounted on the lower sides of the rails 16, the drive pulley 12 being operated by a sprocket 11 attached to the shaft thereof and engaging one reach of the sprocket chain 8, so as to drive the belt conveyor 13 in a direction opposite the movement of the upper conveyor 2. The conveyor 13 is inclined upwardly from the rear of the machine toward the front thereof and is designed to receive empty trays from the upper conveyor and deliver the same in stacked relation into a rack 20 attached to the forward end of the frame 1, said rack including side plates 21, spaced angle bars 23 and end straps 22. The discharge end of conveyor 2 is connected to the receiving end of the conveyor 13 by a chute 15, which serves to divert the empty trays discharged from the conveyor 2 onto the upper reach of the lower conveyor 13, as indicated in Fig. 3.

Figure 4:
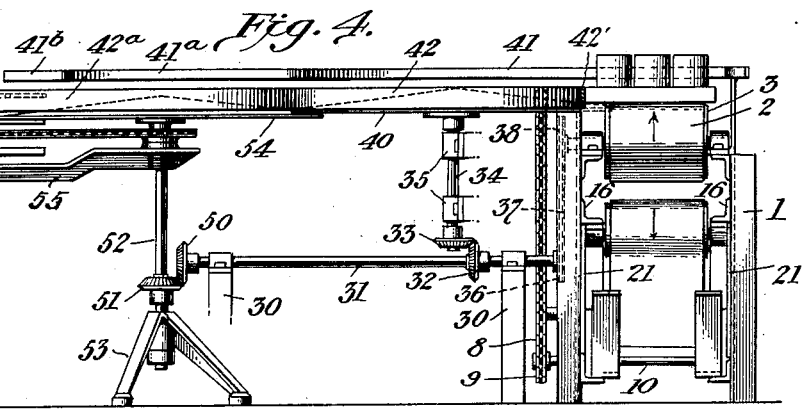
Fig. 4 is an end elevation.
Figure 5:
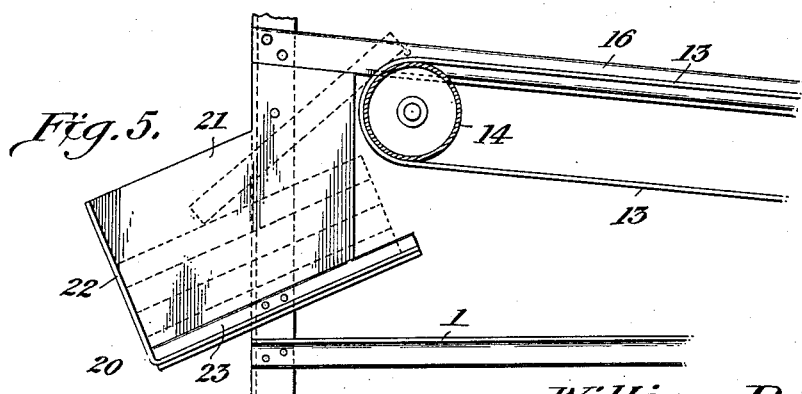
Fig. 5 is a fragmentary sectional side elevation illustrating the discharge end of the conveyor for returning the empty trays and delivering the same in stacked relation.

Located at one side of the conveyor 2 is a rotary table 40 in the form of a relatively flat cone, the periphery of which lies partly below and immediately adjacent the upper reach of conveyor 2, said table being mounted upon a vertical shaft 34, which is journaled in bearings 35, 35, which may be mounted on the main frame 1 or upon a suitable pedestal or support adjacent thereto. The shaft 34 is driven by a bevel-gear 33 fast to its lower end and meshing with a bevel-gear 32 fast to horizontal shaft 31 journaled in pedestals 30, 30, said shaft 31 being driven through bevel-gears 50, 51 from shaft 52, which, in turn, is driven by chain from the processing machine to which the cans are fed, as shown in Figs. 1 and 4.

Supported adjacent the periphery of the table 40 is a stationary guard rail 41, extending substantially half way around the periphery of the table and spaced at a distance above the table, one end 41' of the guard rail being extended over the conveyor 2 and the open sided can carrying trays carried thereby, said extension being substantially tangential to the periphery of the table and extending forwardly to constitute a wiper to engage the cans carried by the trays and force the cans en masse from the trays onto the rotary table, as more particularly illustrated in Figs. 1 and 2. The other side of the table is provided with a guard rail 42, which is supported by suitable brackets, not shown, in close proximity to the periphery of the table, said rail being provided with an extension 42′, which is parallel with the conveyor 2 and serves to close the open sides of the trays as the latter are fed to the conveyor. Secured to the guard rail 42 is a guide rail 45, which overlies the top of the table and is spaced from the guard rail 41 at a distance to afford a discharge of the cans moving with the table, in a single line or row, so that the cans will be delivered from the table singly either directly to a processing machine, or, as shown, to a second rotary table 54, generally similar in construction to table 40 but driven in an opposite direction thereto.

The table 54 is provided with a guard rail 41a, which is preferably formed as an extension of guard rail 41, and is provided at its end with a guide rail 41b, said guard rail 41a and guide rail 41b overlying the top of table 54, as indicated in Fig. 1. Said table 54 is likewise provided with a stationary guard rail 42a, which is preferably formed as a continuation of guard rail 42 and said guard rail cooperates with the guide rail 41b to form a discharge for the cans in a single row or series to deliver the cans individually to the feeding means directly associated with a processing machine, such as a pre-vacuumizing machine or a siruper.

The table 54 is fast to a vertical shaft 52 journaled in a standard 53 and bearing bracket 55, said shaft having fast thereto a bevel-gear 51 meshing with a bevel-gear 50 on the end of shaft 31, the said bevel-gears 50 and 51 being so disposed as to drive the table 54 in an opposite direction to the movement of the table 40.

In the operation of the apparatus, the usual open sided trays containing the cans, in the manner and form illustrated in Figs. 1 and 2, are placed on the conveyor 2 and are advanced in series by the conveyor until the extension 41′ of the guard rail 41 engages the upper portions of the cans projecting above the tray rim, said guard rail extension serving to sweep or move the cans en masse from the tray onto the rotary table 40, the empty tray passing under the guard rail section being discharged from the end of the conveyor 2 into the chute 15, whence it is delivered to the upper reach of the conveyor 13, from which it is discharged into the rack 20, the empty trays accumulating in said rack in stacked relation, from which they may be readily removed for refilling. The cans delivered to the top of the table 40, the rotary motion of which table causes the cans to slide toward the periphery and engage the guard rail 41, are ultimately discharged singly through the discharge opening formed by the guard rail 41 and guide rail 45. Obviously, the cans thus discharged in a single row from the table 40 may be delivered directly to a processing machine, but it has been found desirable to deliver the cans from table 40 onto the second table 54, where the individual cans are carried along in engagement with the guard rail 42a and are delivered in single file from the table by the discharge formed by guide rail section 41b and the guard rail 42a. Any of the cans on either table 40 or table 54 which do not engage the guard rails 41 or 42a, respectively, will be carried around by the movement of the table until they ultimately contact the respective guard rails, thereby insuring the delivery of the cans in single series from each of the tables.

The apparatus, as described, involving either a single rotary table or two rotary tables driven in opposite directions, enables cans to be fed to the processing machine at a more rapid rate than heretofore found practicable with other types of feeding apparatus and requires the attention of a single operator to feed the filled trays to the upper conveyor 2 and remove the stacks of empty trays from the rack.

What we claim is:

1. A feeding device for cans, comprising a rotary table having an inclined top surface, a conveyor adapted to transport open sided can carrying trays adjacent to the edge of said table, stationary guard rails adjacent the periphery of the table one rail extending over the conveyor and the trays thereon at an angle to the line of movement of the conveyor to engage the cans carried by the trays and force said cans from the trays onto the table, and a guide rail cooperating with one guard rail to form a discharge for a continuous single row of cans.

2. A feeding device for cans, comprising a rotary table having a conical top, a conveyor adapted to transport open sided can carrying trays adjacent to the periphery of said table, stationary guard rails adjacent said periphery one rail extending over the conveyor and the trays thereon at an angle to the line of movement of the conveyor to engage the cans carried by the trays and force said cans from the trays onto the table, and a guide rail cooperating with one guard rail to form a discharge for a continuous single row of cans.

3. A feeding device for cans, comprising a rotary table, a conveyor adapted to transport open sided can carrying trays adjacent to the edge of said table, stationary guard rails adjacent the periphery of the table one rail extending over the conveyor and the trays thereon at an angle to the line of movement of the conveyor to engage the cans carried by the trays and force said cans from the trays onto the table, a guide rail cooperating with one guard rail to form a discharge for a continuous single row of cans, and a second table generally similar to and arranged to receive the cans from the first table and having cooperating guard and guide rails to retain the cans on the second table and discharge the cans in single file therefrom.

4. A can feeding device as set forth in claim 3 in which the second table is rotated in a direction opposite to that of the first table.

5. A can feeding device as set forth in claim 3 in which the tables are rotated in opposite direction and the first table overlaps the second.

6. A can feeding device, including a rotary conical topped table, stationary peripheral guard rails, a guide rail spaced from one guard rail to form therewith a discharge for cans in single file, a conveyor for open sided cans carrying trays moving adjacent the edge of the table, one of said guard rails having an extension spanning the conveyor and the trays thereon and adapted to move the cans en masse from the trays onto the table, and a second conveyor for receiving the empty trays and discharging the same in stacked relation.

7. A can feeding device as set forth in claim 6 in which the second conveyor is located below the first conveyor and is driven in an opposite direction thereto.

8. A can feeding device as set forth in claim 6 in which the second conveyor is located below the first conveyor and is driven in an opposite direction thereto, and a chute connecting the two conveyors.

9. A can feeding device, comprising a conveyor for open sided can carrying trays, a rotary conical topped table located at one side of said conveyor, and stationary guard and guide rails associated with the table and conveyor to move the cans en masse from the trays onto the table to discharge the cans in single file from the table.

10. A can feeding device as set forth in claim 9 associated with a second rotary table of the same general form arranged to receive the cans discharged from the first table and provided with similar guard and guide rails.

11. A can feeding device as set forth in claim 9 associated with a second conveyor arranged below the first conveyor, a chute connecting the conveyors, and a rack at the discharge end of the second conveyor adapted to receive and stack the empty trays.

12. A can feeding device, comprising a conveyor for open sided can carrying trays, a rotary conical topped table located at one side of said conveyor, stationary guard and guide rails associated with the table and conveyor to move the cans en masse from the trays onto the table and discharge the cans in single file from the table, a second conveyor arranged below the first conveyor, a chute connecting the conveyors, and a rack to receive and stack the empty trays from the second conveyor.

In testimony whereof we affix our signatures.

WILLIAM P. SLEDGE.
JOHN LE FRANK.